US012278562B2

(12) United States Patent
Liang et al.

(10) Patent No.: US 12,278,562 B2
(45) Date of Patent: Apr. 15, 2025

(54) BIPHASIC DICKSON SWITCHED CAPACITOR CONVERTER

(71) Applicant: Southchip Semiconductor Technology (Shanghai) Co., Ltd., Shanghai (CN)

(72) Inventors: Xing Liang, Shanghai (CN); Wei Zhao, Shanghai (CN)

(73) Assignee: Southchip Semiconductor Technology (Shanghai) Co., Ltd., Shanghai (CN)

(*) Notice: Subject to any disclaimer, the term of this patent is extended or adjusted under 35 U.S.C. 154(b) by 239 days.

(21) Appl. No.: 17/985,059

(22) Filed: Nov. 10, 2022

(65) Prior Publication Data

US 2023/0155495 A1 May 18, 2023

(30) Foreign Application Priority Data

Nov. 12, 2021 (CN) .......................... 202111353958.5

(51) Int. Cl.
*H02M 3/07* (2006.01)
*H02M 1/00* (2006.01)
*H02M 1/08* (2006.01)

(52) U.S. Cl.
CPC ........... *H02M 3/07* (2013.01); *H02M 1/0058* (2021.05); *H02M 1/083* (2013.01)

(58) Field of Classification Search
CPC ....... H02M 3/07; H02M 1/0058; H02M 1/083
See application file for complete search history.

(56) References Cited

U.S. PATENT DOCUMENTS 11,362,576 B1 * 6/2022 Rizzolatti ............... H02M 3/07
2022/0247303 A1 * 8/2022 Jin ....................... H02M 3/1584

FOREIGN PATENT DOCUMENTS

| CN | 110165892 | 8/2019 |
| CN | 110729888 | 11/2020 |
| CN | 114070041 | 2/2022 |

* cited by examiner

*Primary Examiner* — Rafael O De Leon Domenech (57) ABSTRACT

A biphasic Dickson switched capacitor converter includes an auxiliary circuit, a first branch and a second branch, the auxiliary circuit is connected between the first branch and the second branch, and electric charges at one of the first branch and the second branch are transferred to another of the first branch and the second branch by controlling the auxiliary circuit during a dead time when primary power transistors are turned off to realize the primary power transistors turn on at zero voltage and reduce a switching loss.

8 Claims, 9 Drawing Sheets

BIPHASIC DICKSON SWITCHED CAPACITOR CONVERTER

CROSS-REFERENCE TO RELATED APPLICATION

This application claims the priority benefit of Chinese application serial no. 202111353958.5, filed on Nov. 12, 2021. The entirety of the above-mentioned patent application is hereby incorporated by reference herein and made a part of this specification.

BACKGROUND

Technical Field

The present application relates to the field of switching power supply, and particularly relates to a biphasic Dickson switched capacitor converter.

Description of Related Art

Conventional inductive direct current-direct current (DC-DC) converters (for example, buck, boost, buck-boost, etc.) are widely used in 5G base station, server power supply, and mobile phone motherboard to achieve a conversion between different voltages. However, a conversion efficiency of the conventional inductive converter is generally inefficient due to large switching loss and inductive loss. In some applications, such as 5G communication with high power consumption and mobile phones with high power fast charging, the inductive converter requires higher conversion efficiency. Conventional inductive converters do not meet requirements of the conversion efficiency.

Since the energy density of capacitors is higher than that of inductors, the conversion efficiency of switched capacitor converters using capacitors for energy transmission is much higher than that of the inductive DC-DC converter, and the switched capacitor converters are widely used in various high efficiency scenarios. And Dickson switched capacitor converters are widely used because of their low equivalent impedance.

Figure 1:
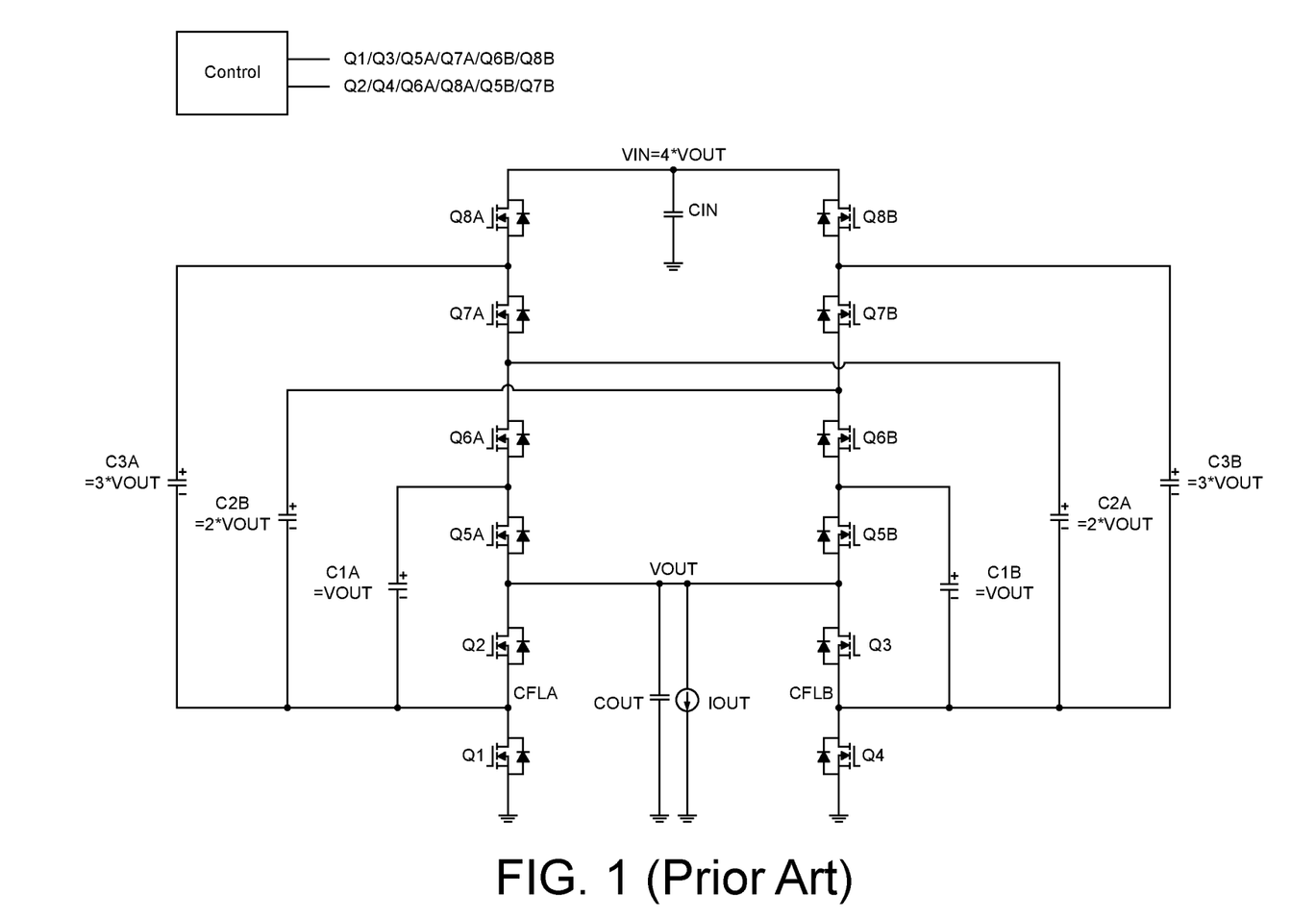
FIG. 1 is a schematic diagram showing a circuit structure of a conventional biphasic 4:1 switched capacitor converter.

As shown in FIG. 1, a conventional biphasic Dickson type 4:1 switched capacitor converter includes twelve power transistors (i.e., Q1, Q2, Q3, Q4, Q5A, Q5B, Q6A, Q6B, Q7A, Q7B, Q8A and Q8B), six capacitors (i.e., OA, C1B, C2A, C2B, C3A and C3B), an input capacitor CIN, an output capacitor COUT and an output load TOUT. In control, the power transistor Q1, the power transistor Q3, the power transistor Q5A, the power transistor Q7A, the power transistor Q6B and the power transistor Q8B are driven by a same control signal, and the power transistor Q2, the power transistor Q4, the power transistor Q6A, the power transistor Q8A, the power transistor Q5B and the power transistor Q7B also are driven by a same control signal. Both control signals are square wave signals with 50% duty ratio, and have a complementary in waveform. The conventional biphasic Dickson 4:1 switched capacitor converter can realize that an output voltage VOUT is a quarter of an input voltage, i.e. VIN=4*VOUT. And voltage differences of the six capacitors are VC1A=VC1B=VOUT, VC2A=VC2B=2*VOUT, VC3A=VC3B=3*VOUT, respectively.

Although the conventional biphasic Dickson 4:1 switched capacitor converter do not have switching-off loss and inductive loss, it still needs to overcome two parasitic capacitors Cds and Cgd when the power transistor is turned on, therefore, the two parasitic capacitors have a certain switching-on loss. For high voltage and low current applications, a ratio of switching-on loss is larger due to higher voltage differences of the two capacitors Cds and Cgd, which limits the further improvement of converter efficiency of the conventional biphasic Dickson 4:1 switched capacitor converter.

SUMMARY

The present application is directed to the above-mentioned problems, and a biphasic switched capacitor converter is proposed, all primary power transistors can turn on at zero voltage by using an auxiliary circuit, thereby reducing switching loss. Furthermore, the biphasic switched capacitor converter is a biphasic N:1 zero voltage switching-on (ZVS) switched capacitor converter.

An aspect of the embodiments of the present application provides a biphasic dickson switched capacitor converter, including a first branch, a second branch and an auxiliary circuit, the auxiliary circuit is connected between the first branch and the second branch, the first branch and the second branch are connected in parallel to an output terminal of the biphasic dickson switched capacitor converter, and power transistors of the first branch and the second branch are primary power transistors; the auxiliary circuit is configured to transfer an electric charge or electric charges on one of the first branch and the second branch to another of the first branch and the second branch during a dead time when the primary power transistors are turned off, so that voltage difference between both terminals of each of the primary power transistors become zero to, then the primary power transistors are turned on under a zero voltage respectively.

In some embodiments of the present application, the biphasic dickson switched capacitor converter is a biphasic dickson 4:1 switched capacitor converter, the first branch includes a first power transistor, a second power transistor, a fifth power transistor, a sixth power transistor, a seventh power transistor, an eighth power transistor, a first capacitor, a second capacitor and a third capacitor, and the second branch includes a third power transistor, a fourth power transistor, a ninth power transistor, a tenth power transistor, an eleventh power transistor, a twelfth power transistor, a fourth capacitor, a fifth capacitor and a sixth capacitor.

A first terminal of the eighth power transistor and a first terminal of the twelfth power transistor are connected as an input terminal of the biphasic dickson switched capacitor converter, the input terminal of the biphasic dickson switched capacitor converter is connected to an external input voltage, a second terminal of the eighth power transistor is connected to a first terminal of the seventh power transistor and a first terminal of the third capacitor respectively, and a second terminal of the twelfth power transistor is connected to a first terminal of the eleventh power transistor and a first terminal of the sixth capacitor respectively.

A second terminal of the seventh power transistor is connected to a first terminal of the sixth power transistor and a first terminal of the fifth capacitor respectively, and a second terminal of the eleventh power transistor is connected to a first terminal of the tenth power transistor and a first terminal of the second capacitor respectively.

A second terminal of the sixth power transistor is connected to a first terminal of the fifth power transistor and a first terminal of the first capacitor, and a second terminal of the tenth power transistor is connected to a first terminal of the ninth power transistor and a first terminal of the fourth capacitor respectively.

A second terminal of the fifth power transistor is connected to a first terminal of the second power transistor, and a second terminal of the ninth power transistor is connected to a first terminal of the third power transistor.

A second terminal of the second power transistor is connected to a first terminal of the first power transistor, a second terminal of the first capacitor, a second terminal of the second capacitor and a second terminal of the third capacitor respectively; a second terminal of the third power transistor is connected to a first terminal of the fourth power transistor, a second terminal of the fourth capacitor, a second terminal of the fifth capacitor and a second terminal of the sixth capacitor respectively; and a second terminal of the first power transistor and a second terminal of the fourth power transistor are grounded.

The second terminal of the fifth power transistor, the first terminal of the second power transistor, the first terminal of the third power transistor and the second terminal of the ninth power transistor are connected as the output terminal.

The first terminal of the first power transistor, the second terminal of the second power transistor, the second terminal of the first capacitor, the second terminal of the second capacitor and the second terminal of the third capacitor are connected as a first node of the first branch, and the second terminal of the third power transistor, the first terminal of the fourth power transistor, the second terminal of the fourth capacitor, the second terminal of the fifth capacitor and the second terminal of the sixth capacitor are connected as a second node of the second branch.

In some embodiments of the present application, the auxiliary circuit includes a thirteenth power transistor, a fourteenth power transistor, a fifteenth power transistor, a sixteenth power transistor and an inductor; a first terminal of the thirteenth power transistor is connected to the first node, a second terminal of the thirteenth power transistor is connected to a first terminal of the inductor and a first terminal of the fourteenth power transistor respectively, and a second terminal of the fourteenth power transistor is grounded; and a second terminal of the inductor is connected to a first terminal of the fifteenth power transistor and a first terminal of the sixteenth power transistor respectively, a second terminal of the fifteenth power transistor is grounded, and a second terminal of the sixteenth power transistor is connected to the second node.

In some embodiments of the present application, a working sequence of the biphasic dickson switched capacitor converter includes four stages as follows.

A first stage: the second power transistor, the fourth power transistor, the sixth power transistor, the eighth power transistor, the ninth power transistor, the eleventh power transistor, the fourteenth power transistor and the sixteenth power transistor are turned on, and remaining power transistors are turned off; the first capacitor, the second capacitor and the third capacitor are in a charging state, the fourth capacitor, the fifth capacitor and the sixth capacitor are in a discharging state, and a current on the inductor is zero.

A second stage: the thirteenth power transistor and the sixteenth power transistor are turned on, and remaining power transistors are turned off, the current on the inductor increases and then decreases, and the second stage ends when the current on the inductor decreases to zero.

A third stage: the first power transistor, the third power transistor, the fifth power transistor, the seventh power transistor, the tenth power transistor, the twelfth power transistor, the thirteenth power transistor and the fifteenth power transistor are turned on, and remaining power transistors are turned off; the first capacitor, the second capacitor and the third capacitor are in the discharging state, the fourth capacitor, the fifth capacitor and the sixth capacitor are in the charging state, and the current on the inductor is zero.

A fourth stage: the thirteenth power transistor and the sixteenth power transistor are turned on, and remaining power transistors are turned off, the current on the inductor increases and then decreases, and the fourth stage ends when the current on the inductor decreases to zero, and returning to the first stage.

In some embodiments of the present application, the biphasic dickson switched capacitor converter is biphasic Dickson N:1 switched capacitor converter, and N is an integer greater than or equal to 5.

The first branch includes a first power transistor, a second power transistor, N first sub power transistors and N−1 first sub capacitors, and the second branch includes a third power transistor, a fourth power transistor, N second sub power transistor and N−1 second sub capacitors;

both terminals of the auxiliary circuit are connected to a first node between the first power transistor and the second power transistor and a second node between the third power transistor and the fourth power transistor respectively.

An input terminal of the biphasic dickson switched capacitor converter is connected to the output terminal through the N first sub power transistors and the N−1 second sub capacitors respectively, the N first sub power transistors are connected in turn, and the N−1 second sub capacitors are connected in turn.

Two adjacent first sub power transistors form a first sub power transistor pair, two adjacent first sub power transistor pairs include a same first sub power transistor; and two adjacent second sub power transistors form a second sub power transistor pair, two adjacent second sub power transistor pairs include a same second sub power transistor.

Any two adjacent first sub power transistor pairs include a first pair of first sub power transistor pair and a second pair of first sub power transistor pair, one of the N−1 first sub capacitors is connected between two first sub power transistors of the first pair of first sub power transistor pair, one of the N−1 second sub capacitors is connected between two first sub power transistors of the second pair of first sub power transistor pair.

Any two adjacent second sub power transistor pairs include a first pair of second sub power transistor pair and a second pair of second sub power transistor pair, another of the N−1 first sub capacitors is connected between two second sub power transistors of the first pair of second sub power transistor pair, and another of the N−1 second sub capacitors is connected between two second sub power transistors of the second pair of second sub power transistor pair.

One of the N−1 first sub capacitors is connected between two first sub power transistors of a 1-th first sub power transistor pair which is connected the output terminal, and one of the N−1 second sub capacitors is connected between two second sub power transistors of a 1-th second sub power transistor pair which is connected the output terminal.

All second terminals of the N−1 first sub capacitors are connected to the first node, and all second terminals of the N−1 second sub capacitors are connected to the second node.

In some embodiments of the present application, the thirteenth power transistor, the fourteenth power transistor, the fifteenth power transistor and the sixteenth power transistor are N-type power transistors; or the thirteenth power transistor and the sixteenth power transistor are P-type power transistors, and the fourteenth power transistor and the fifteenth power transistor are N-type power transistors.

In some embodiments of the present application, the auxiliary circuit includes a thirteenth power transistor, a sixteenth power transistor, a first diode, a second diode and an inductor; a first terminal of the thirteenth power transistor is connected to the first branch, a second terminal of the thirteenth power transistor is connected to a first terminal of the first diode and a first terminal of the inductor, a second terminal of the first diode is grounded; and a second terminal of the inductor is connected to a first terminal of the second diode and a first terminal of the sixteenth power transistor, a second terminal of the second diode is grounded, and a second terminal of the sixteenth power transistor is connected to the second branch.

In some embodiments of the present application, the auxiliary circuit includes a thirteenth power transistor, a sixteenth power transistor and inductor, a first terminal of the thirteenth power transistor is connected to the first branch, a second terminal of the thirteenth power transistor is connected to a first terminal of the inductor, a second terminal of the inductor is connected to a first terminal of the sixteenth power transistor, and a second terminal of the sixteenth power transistor is connected to the second branch.

In some embodiments of the present application, the thirteenth power transistor and the sixteenth power transistor are N-type power transistors or P-type power transistors.

The above-mentioned control sequence is used in the biphasic switched capacitor converter, of course, the biphasic switched capacitor converter can use other control sequence.

The auxiliary circuit are added between two branches at outer side of the biphasic switched capacitor converter, an electric charge or electric charges at a branch can be transferred to another branch by controlling the auxiliary circuit during a dead time when all primary power transistors are turned off, so as to realize zero voltage switching (ZVS) of all primary power transistors and reduce the switching loss. The on-resistance of the auxiliary power transistor is much larger than the on-resistance of the primary power transistor, and the cost is very low. The inductance value of the auxiliary inductor is small and the package size and cost are also very low. Therefore, by adding the auxiliary circuit, the biphasic switched capacitor converter of the embodiments of the present application can significantly reduce the switching loss of a switched capacitor converter, improve efficiency, and has good performance benefits and commercial prospects.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

To describe the technical solutions in embodiments of the present application more clearly, the following briefly describes the accompanying drawings required for describing the embodiments. It should be noted that, the embodiments of the present application and the features in the different embodiments may be combined with each other under the condition that they do not conflict with each other.

Figure 2:
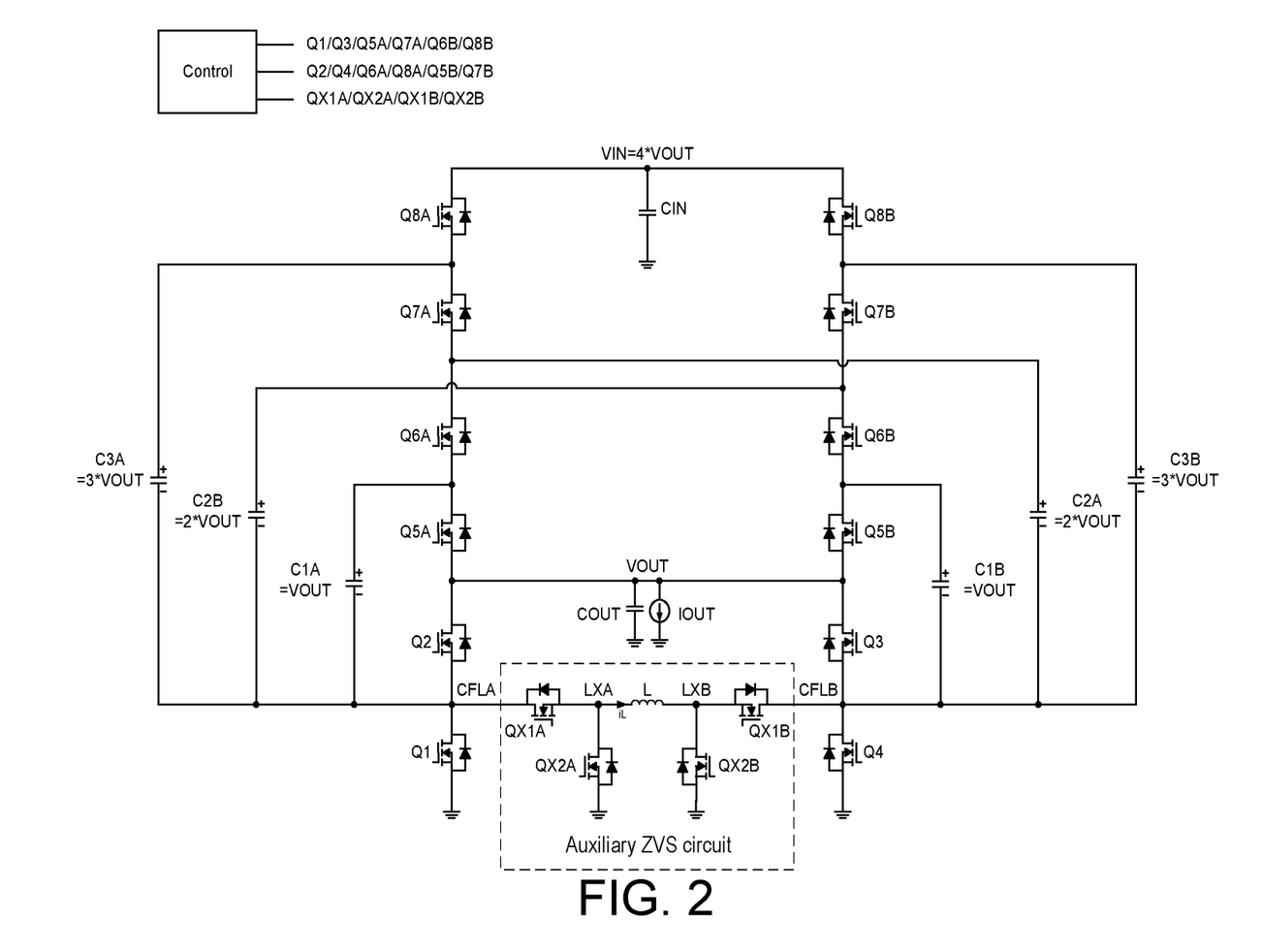
FIG. 2 is a schematic diagram showing a circuit structure of a biphasic 4:1 switched capacitor converter of an embodiment of the present application.

As shown in FIG. 2, the biphasic 4:1 switched capacitor converter of an embodiment of the present application includes a primary power circuit and an auxiliary circuit. The primary power includes twelve primary power transistors (i.e., a first power transistor Q1, a second power transistor Q2, a third power transistor Q3, a fourth power transistor Q4, a fifth power transistor Q5A, a ninth power transistor Q5B, a sixth power transistor Q6A, a tenth power transistor Q6B, a seventh power transistor Q7A, an eleventh power transistor Q7B, an eighth power transistor Q8A and a twelfth power transistor Q8B), 6 capacitors (i.e., a first capacitor OA, a fourth capacitor C1B, a fifth capacitor C2A, a second capacitor C2B, a third capacitor C3A and a sixth capacitor C3B), an input capacitor CIN, an output capacitor COUT and an output load TOUT. The auxiliary circuit includes four auxiliary power transistors (i.e., a thirteenth power transistor QX1A, a fourteenth power transistor QX2A, a sixteenth power transistor QX1B and a fifteenth power transistor QX2B), and an auxiliary inductor L.

The primary power circuit includes a first branch and a second branch, the first branch includes the first power transistor Q1, the second power transistor Q2, the fifth power transistor Q5A, the sixth power transistor Q6A, the seventh power transistor Q7A, the eighth power transistor Q8A, the first capacitor OA, the second capacitor C2B and the third capacitor C3A, and the second branch includes the third power transistor Q3, the fourth power transistor Q4, the ninth power transistor Q5B, the tenth power transistor Q6B, the eleventh power transistor Q7B, the twelfth power transistor Q8B, the fourth capacitor C1B, the fifth capacitor C2A and the sixth capacitor C3B.

A first terminal of the eighth power transistor Q8A and a first terminal of the twelfth power transistor Q8B are connected as an input terminal of the biphasic dickson switched capacitor converter, the input terminal of the biphasic dickson switched capacitor converter is connected to an external input voltage, a second terminal of the eighth power transistor Q8A is connected to a first terminal of the seventh power transistor Q7A and a first terminal of the third capacitor C3A respectively, and a second terminal of the twelfth power transistor Q8B is connected to a first terminal of the eleventh power transistor Q7B and a first terminal of the sixth capacitor C3B respectively.

A second terminal of the seventh power transistor Q7A is connected to a first terminal of the sixth power transistor Q6A and a first terminal of the fifth capacitor C2A respectively, and a second terminal of the eleventh power transistor Q7B is connected to a first terminal of the tenth power transistor Q6B and a first terminal of the second capacitor C2B respectively.

A second terminal of the sixth power transistor Q6A is connected to a first terminal of the fifth power transistor Q5A and a first terminal of the first capacitor OA, and a second terminal of the tenth power transistor Q6B is connected to a first terminal of the ninth power transistor Q5B and a first terminal of the fourth capacitor C1B respectively.

A second terminal of the fifth power transistor Q5A is connected to a first terminal of the second power transistor Q2, and a second terminal of the ninth power transistor Q5B is connected to a first terminal of the third power transistor Q3.

A second terminal of the second power transistor Q2 is connected to a first terminal of the first power transistor Q1, a second terminal of the first capacitor OA, a second terminal of the second capacitor C2B and a second terminal of the third capacitor C3A respectively; a second terminal of the third power transistor Q3 is connected to a first terminal of the fourth power transistor Q4, a second terminal of the fourth capacitor C1B, a second terminal of the fifth capacitor C2A and a second terminal of the sixth capacitor C3B respectively; and a second terminal of the first power transistor Q1 and a second terminal of the fourth power transistor Q4 are grounded.

The second terminal of the fifth power transistor Q5A, the first terminal of the second power transistor Q2, the first terminal of the third power transistor Q3 and the second terminal of the ninth power transistor Q5B are connected as the output terminal.

The first terminal of the first power transistor Q1, the second terminal of the second power transistor Q2, the second terminal of the first capacitor OA, the second terminal of the second capacitor C2B and the second terminal of the third capacitor C3A are connected as a first node CFLA of the first branch, and the second terminal of the third power transistor Q3, the first terminal of the fourth power transistor Q4, the second terminal of the fourth capacitor C1B, the second terminal of the fifth capacitor C2A and the second terminal of the sixth capacitor C3B are connected as a second node CFLB of the second branch.

The auxiliary circuit includes the thirteenth power transistor QX1A, the fourteenth power transistor QX2A, the fifteenth power transistor QX2B, the sixteenth power transistor QX1B and the inductor L.

A first terminal of the thirteenth power transistor QX1A is connected to the first node CFLA, a second terminal of the thirteenth power transistor QX1A is connected to a first terminal of the inductor L and a first terminal of the fourteenth power transistor QX2A respectively, and a second terminal of the fourteenth power transistor QX2A is grounded.

A second terminal of the inductor L is connected to a first terminal of the fifteenth power transistor QX2B and a first terminal of the sixteenth power transistor QX1B respectively, a second terminal of the fifteenth power transistor QX2B is grounded, and a second terminal of the sixteenth power transistor QX1B is connected to the second node CFLB.

All power transistors in the first branch and the second branch are primary power transistors, and each primary power transistor has a parasitic capacitor.

In steady state working conditions, VIN=4*VOUT, VC1A=VC1B=VOUT, VC2A=VC2B=2*VOUT, VC3A=VC3B=3*VOUT. The VIN presents an input voltage, the VOUT presents an output voltage, the VC1A presents a voltage difference between both terminals of the first capacitor OA, the VC2B presents a voltage difference between both terminals of the second capacitor C2B, the VC3A presents a voltage difference between both terminals of the third capacitor C3A, the VC1B presents a voltage difference between both terminals of the fourth capacitor C1B, the VC2A presents a voltage difference between both terminals of the fifth capacitor C2A, and the VC3B presents a voltage difference between both terminals of the sixth capacitor C3B.

Figure 3:
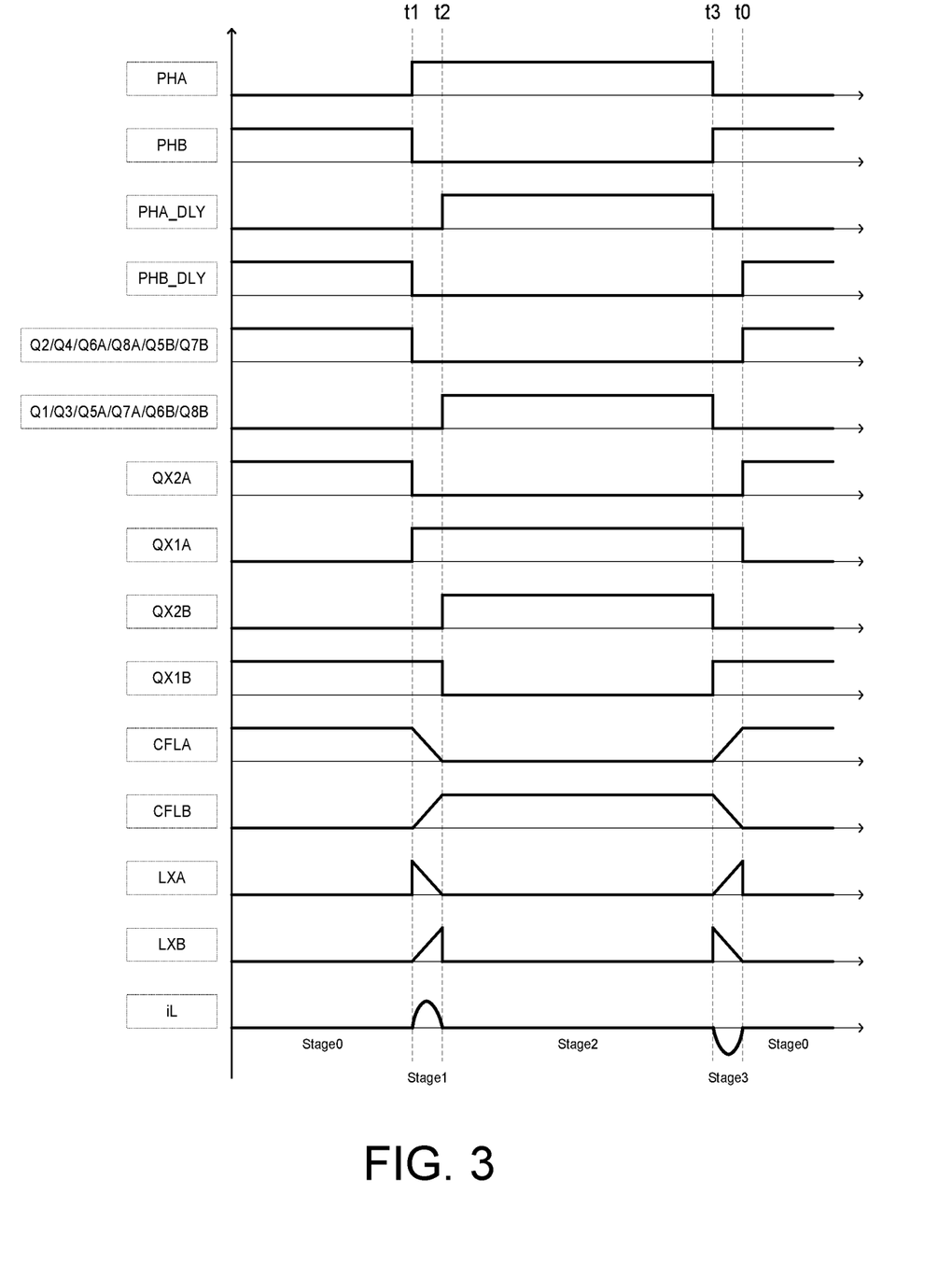
FIG. 3 is a typical waveform diagram of a biphasic 4:1 switched capacitor converter of an embodiment of the present application.

FIG. 3 shows a working waveform of the novel biphasic 4:1 switched capacitor converter in one switching cycle. There are four working states in sequence within one working cycle, namely stage 0, stage 1, stage 2 and stage 3. The signal PHA is an original clock signal with a 50% duty ratio, the signal PHB is an inverse signal of the PHA, the signal PHA_DLY is a clock signal obtained by the PHA passing a delay, and the signal PIB_DLY is a clock signal obtained by PHB passing a delay. Signals corresponding to Q1, Q3, QSA, Q7A, Q6B and Q8B present on-off states of the first power transistor Q1, the third power transistor Q3, the fifth power transistor QSA, the seventh power transistor Q7A, the tenth power transistor Q6B and the twelfth power transistor Q8B respectively, and signals corresponding to Q2, Q4, Q6A, Q8A, Q5B, Q7B present on-off states of the second power transistor Q2, the fourth power transistor Q4, the sixth power transistor Q6A, the eighth power transistor Q8A, the ninth power transistor Q5B and the eleventh power transistor Q7B respectively. Signals corresponding to QX1A, QX2A, QX1B and QX2B present on-off states of the thirteenth power transistor QX1A, the fourteenth power transistor QX2A, the sixteenth power transistor QX1B and the fifteenth power transistor QX2B respectively, signals corresponding to CFLA and CFLB present voltage waveforms of the node CFLA and node CFLB respectively, signals corresponding to LXA and LXB present voltage waveforms of the node LXA and node LXB respectively, and a signal corresponding to iL present a current waveform flowing through the inductor L.

Figure 4:
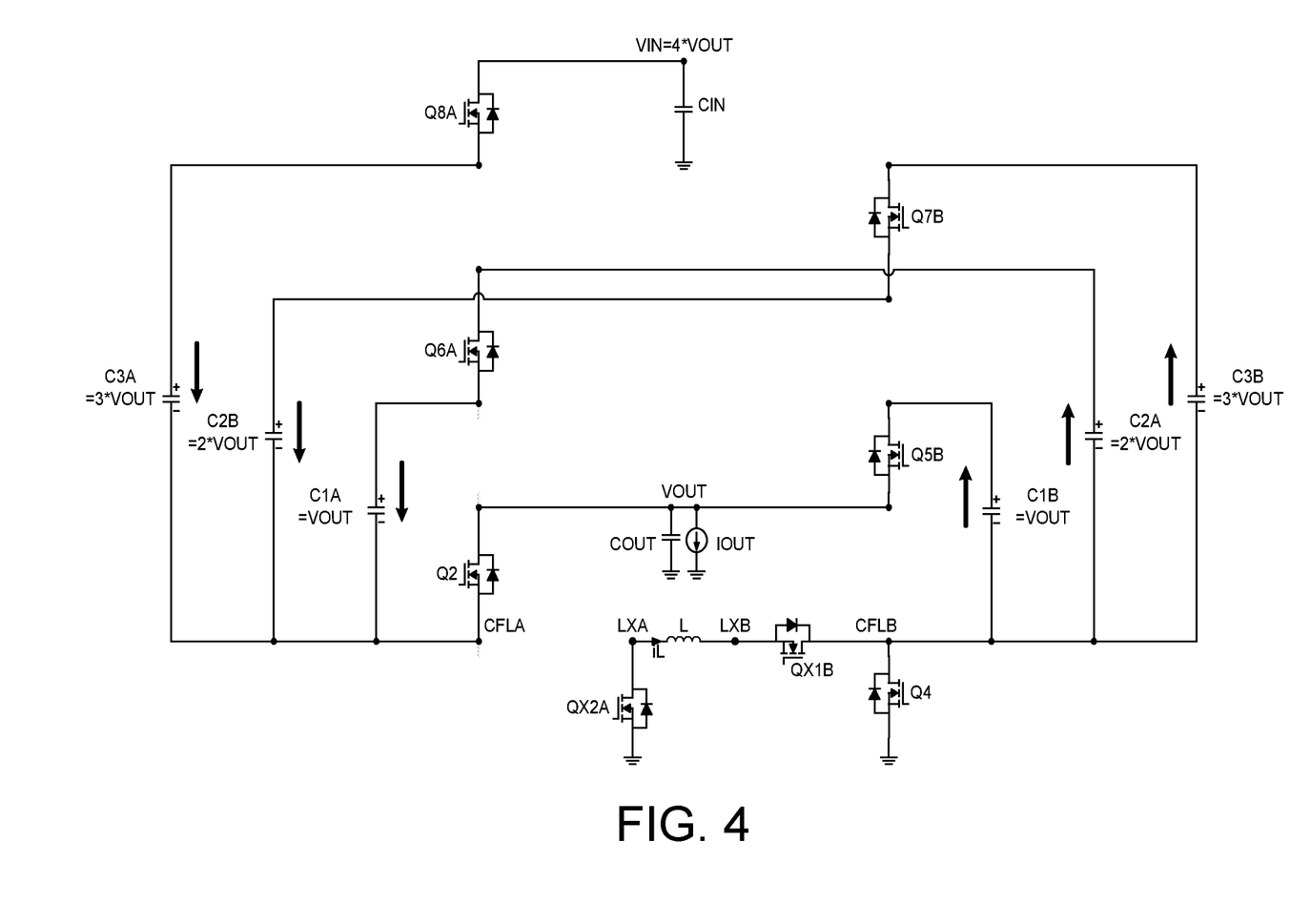
FIG. 4 is an equivalent circuit diagram of a biphasic 4:1 switched-capacitor converter working in Stage 0 of an embodiment of the present application.

Stage 0 (t0-t1): As shown in FIG. 4, in stage 0, the second power transistor Q2, the fourth power transistor Q4, the sixth power transistor Q6A, the eighth power transistor Q8A, the ninth power transistor Q5B and the eleventh power transistor Q7B are turned on, and the first power transistor Q1, the third power transistor Q3, the fifth power transistor Q5A, the seventh power transistor Q7A, the tenth power transistor Q6B and the twelfth power transistor Q8B are turned off. The first capacitor C1A, the second capacitor C2B and the third capacitor C3A are in charging state, and the fourth capacitor C1B, the fifth capacitor C2A and the sixth capacitor C3B are in discharging state. In the auxiliary circuit part, the sixteenth power transistor QX1B and the fourteenth power transistor QX2A are turned on, and the thirteenth power transistor QX1A and the fifteenth power transistor QX2B are turned off. In this stage, a voltage of the first node CFLA is equal to the output voltage, a voltage of the second node CFLB is zero, the voltages of the node LXA and node LXB are zero, and a current flowing through the inductor L is zero.

Figure 5:
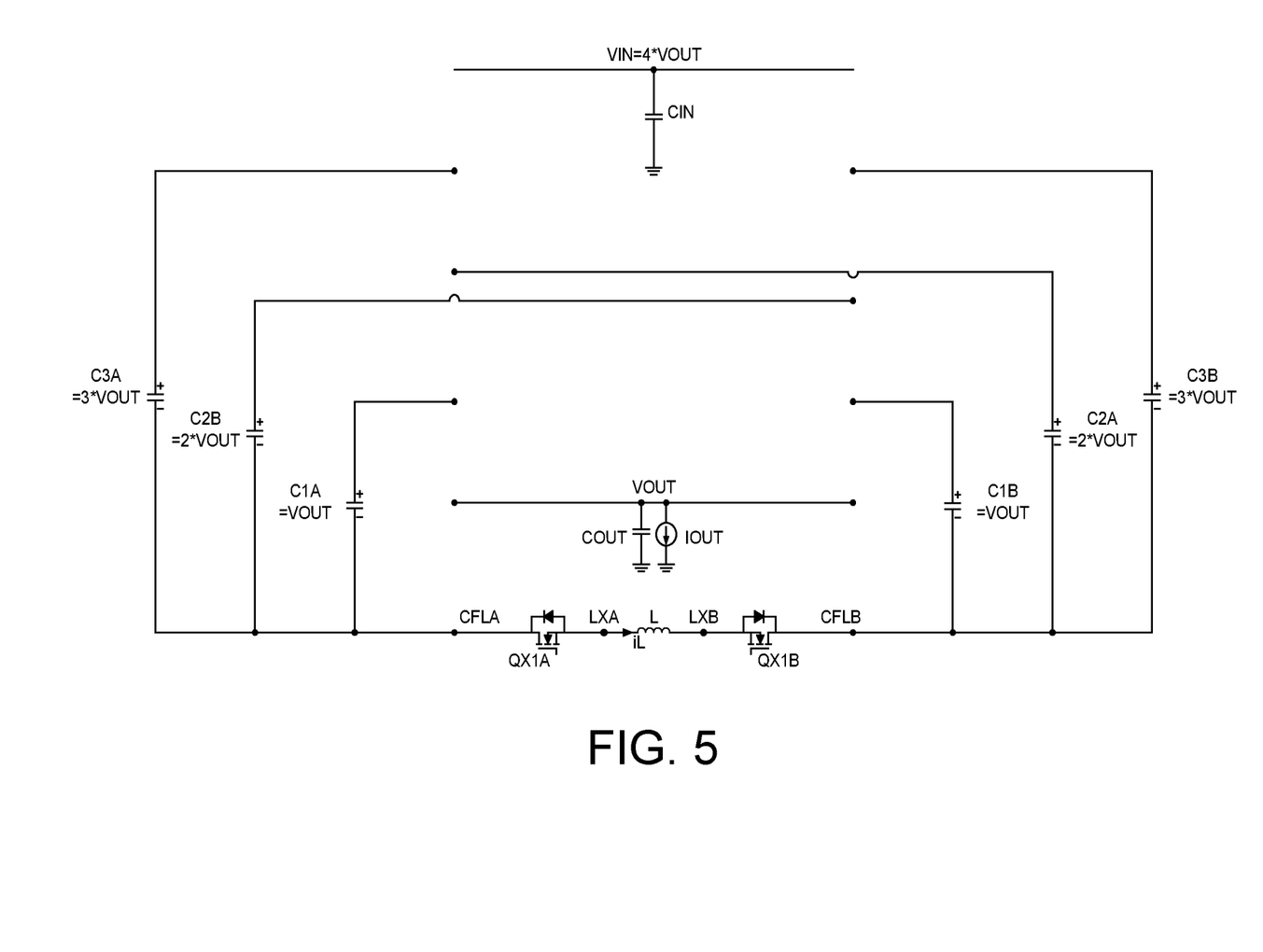
FIG. 5 is an equivalent circuit diagram of a biphasic 4:1 switched capacitor converter working in Stage 1 of an embodiment of the present application.

Stage 1 (t1-t2): As shown in FIG. 5, at the moment t1, the second power transistor Q2, the fourth power transistor Q4, the sixth power transistor Q6A, the eighth power transistor Q8A, the ninth power transistor Q5B and the eleventh power transistor Q7B are turned off, and the first power transistor Q1, the third power transistor Q3, the fifth power transistor Q5A, the seventh power transistor Q7A, the tenth power transistor Q6B and the twelfth power transistor Q8B maintain turning off, therefore, all twelve primary power transistors are turned off. The first capacitor OA, the fourth capacitor C1B, the fifth capacitor C2A, the second capacitor C2B, the third capacitor C3A and the sixth capacitor C3B stop charging or discharging and maintain respective current voltage differences. A current of the load is provided by the output capacitor which is in discharging state. The fourteenth power transistor QX2A and the fifteenth power transistor QX2B are turned off, and thirteenth power transistor QX1A and the sixteenth power transistor QX1B are turned on.

Before the moment t1, a voltage of the first node CFLA is VOUT and a voltage of the second node CFLB are zero. From the moment t1, the inductor L is connected between the first node CFLA and the second node CFLB, then a parasitic capacitor of the first node CFLA and a parasitic capacitor of the second node CFLB, and the inductor L start to resonate. The voltage of the first node CFLA syntonically decreases, the voltage of the second node CFLB syntonically increases, and the current of the inductor L gradually increases. When the voltage of the first node CFLA and the voltage of the second node CFLB are same, the current through the inductor L reach a positive peak value. Then, the voltage of the first node CFLA maintains decreasing, the voltage of the second node CFLB maintains increasing, and the current of the inductor begins to decrease. At the moment t2, the voltage of the first node CFLA resonates to zero, the voltage of the second node CFLB resonates to VOUT, and the current of the inductor L decreases to zero, then the biphasic 4:1 switched capacitor converter enters in stage 2.

It can be seen that the electric charges of the first node CFLA can be transferred to the second node CFLB by using the resonance between the inductor and the parasitic capacitors in stage 1. A ZVS condition is thus provided for the first power transistor Q1, the third power transistor Q3, the fifth power transistor QSA, the seventh power transistor Q7A, the tenth power transistor Q6B and twelfth power transistor Q8B to be turned on in the next stage.

Figure 6:
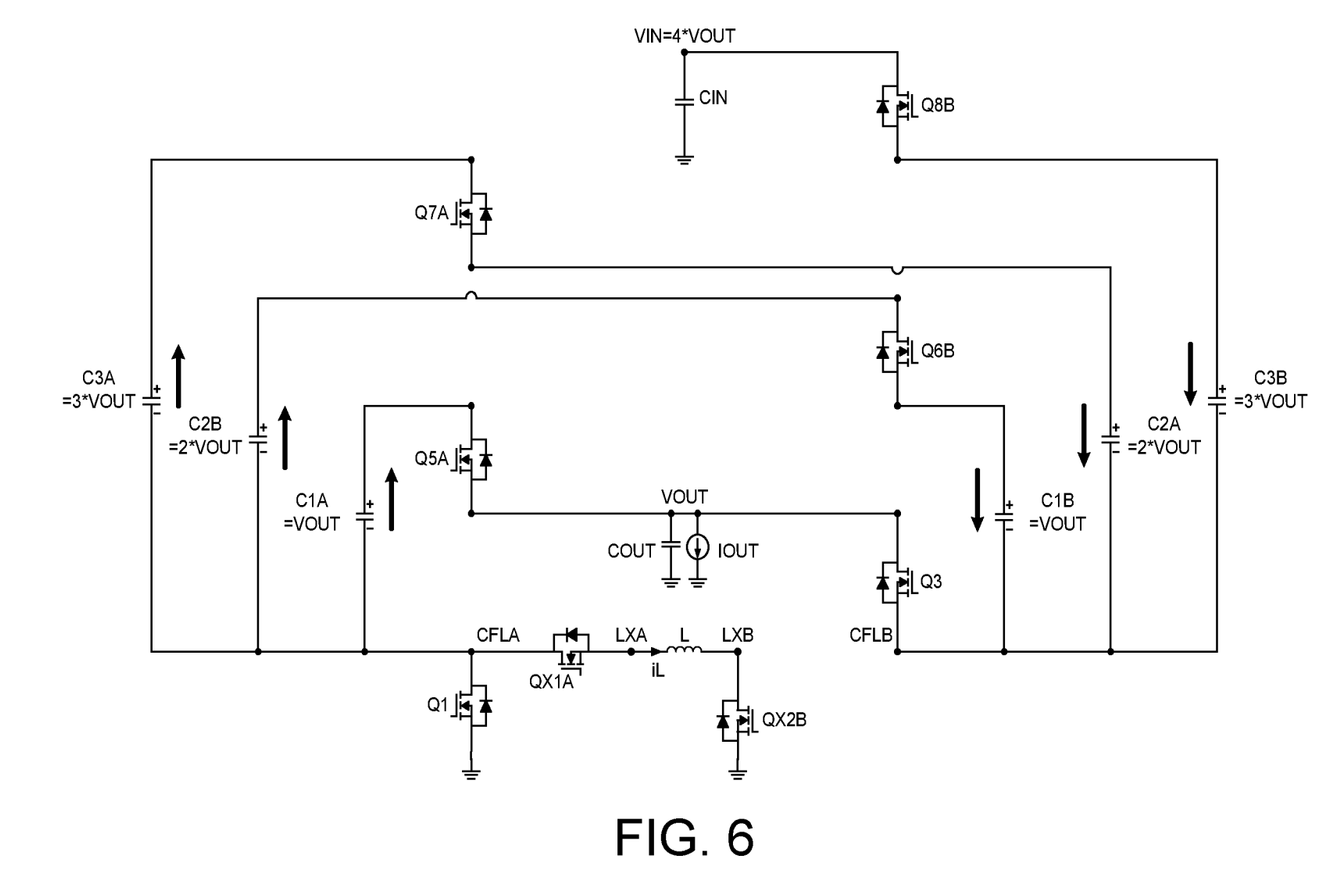
FIG. 6 is an equivalent circuit diagram of a biphasic 4:1 switched capacitor converter working in Stage 2 of an embodiment of the present application.

Stage 2 (t2-t3): As shown in FIG. 6, at the moment t2, the first power transistor Q1, the third power transistor Q3, the fifth power transistor QSA, the seventh power transistor Q7A, the tenth power transistor Q6B and the twelfth power transistor Q8B are turned on at zero voltage, and the second power transistor Q2, the fourth power transistor Q4, the sixth power transistor Q6A, the eighth power transistor Q8A, the ninth power transistor Q5B and the eleventh power transistor Q7B maintain turning off. The thirteenth power transistor QX1A and the fifteenth power transistor QX2B are turned on, and the fourteenth power transistor QX2A and the sixteenth power transistor QX1B are turned off. The biphasic 4:1 switched capacitor converter enters in the stage 2. The first capacitor OA, the second capacitor C2B and third capacitor C3A are in discharging state, and the fourth capacitor C1B, the fifth capacitor C2A and the sixth capacitor C3B are in charging state. The voltage of the first node CFLA is zero, the voltage of the second node CFLB is equal to the output voltage, the voltages of the node LXA and node LXB are zero, and the current flowing through the inductor L is zero.

Figure 7:
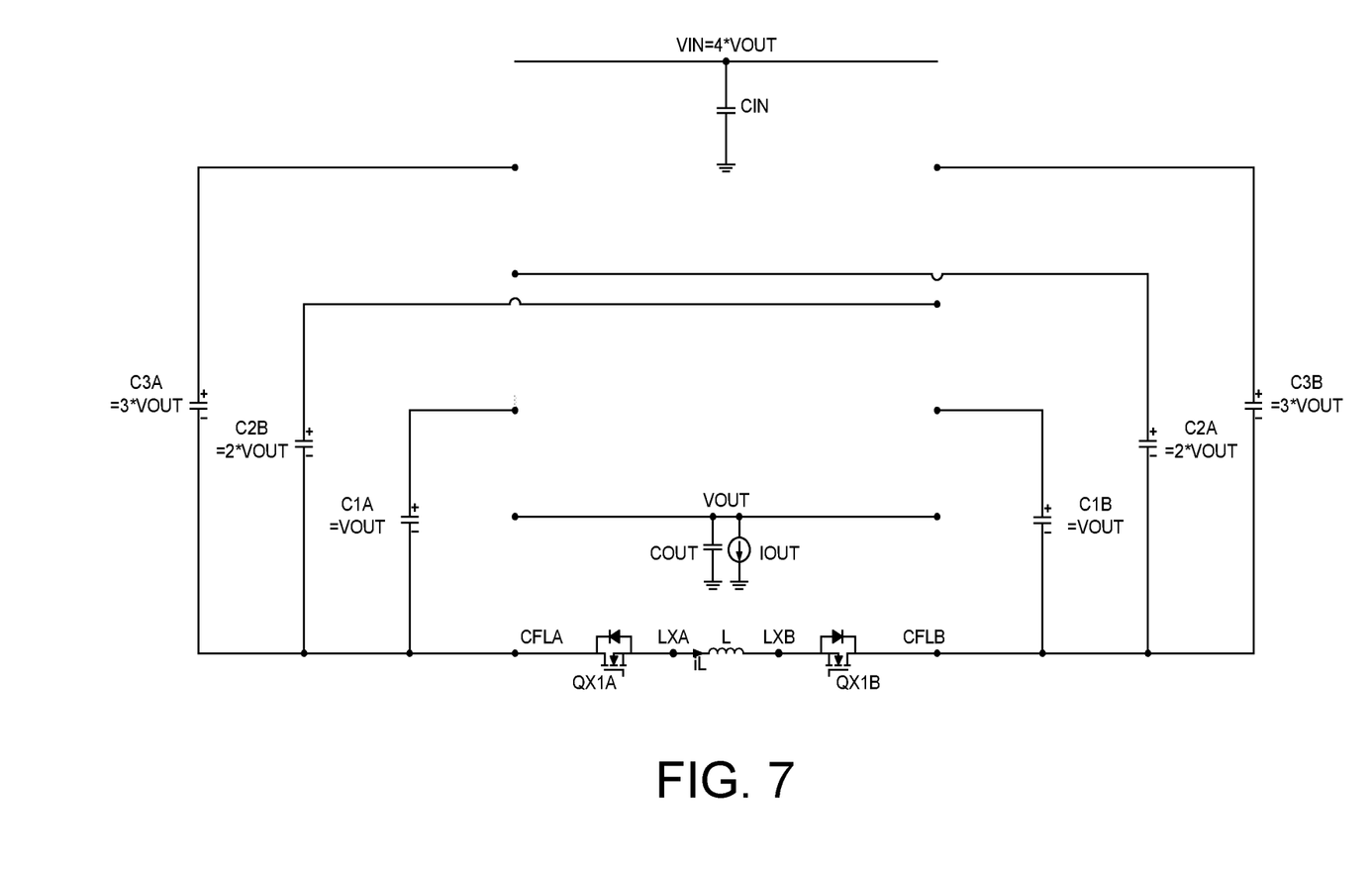
FIG. 7 is an equivalent circuit diagram of a biphasic 4:1 switched capacitor converter working in Stage 3 of an embodiment of the present application.

Stage 3 (t3-t4): As shown in FIG. 7, at the moment t3, the first power transistor Q1, the third power transistor Q3, the fifth power transistor Q5A, the seventh power transistor Q7A, the tenth power transistor Q6B and the twelfth power transistor Q8B are turned off, and the second power transistor Q2, the fourth power transistor Q4, the sixth power transistor Q6A, the eighth power transistor Q8A, the ninth power transistor Q5B and the eleventh power transistor Q7B maintain turning off, therefore, all twelve primary power transistors are turned off. The first capacitor C1A, the second capacitor C2B, the third capacitor C3A, the fourth capacitor C1B, the fifth capacitor C2A and the sixth capacitor C3B stop charging or discharging and maintain the current voltages respectively. The current of the load is provided by the output capacitor which is in discharging state. The fourteenth power transistor QX2A and the fifteenth power transistor QX2B are turned off, and the thirteenth power transistor QX1A and the sixteenth power transistor QX1B are turned on.

Before the moment t3, the voltage of the first node CFLA is zero and the voltage of the second node CFLB is the output voltage. From the moment t3, the inductor L is connected between the first node CFLA and the second node CFLB, then the parasitic capacitor of the first node CFLA, the parasitic capacitor of the second node CFLB and the inductor L start to resonate. The voltage of the first node CFLA syntonically increases, the voltage of the second node CFLB syntonically decreases, and the current of the inductor L gradually increases in negative direction. When the voltage of the first node CFLA and the voltage of the second node CFLB are same, the current through the inductor L reaches a negative peak value. Then, the voltage of the first node CFLA maintains increasing, the voltage of the second node CFLB maintains decreasing, and the current of the inductor L begins to decrease in negative direction. By the moment t0, the voltage of the first node CFLA resonates to the output voltage, the voltage of the second node CFLB resonates to zero, and the current of the inductor L decreases to zero. Then the biphasic 4:1 switched capacitor converter returns to the stage 0.

It can be seen that the electric charges of the second node CFLB can be transferred to the first node CFLA by using the resonance between inductor L and the parasitic capacitors in stage 3. The ZVS condition is thus provided for the second power transistor Q2, the fourth power transistor Q4, the sixth power transistor Q6A, the eighth power transistor Q8A, the ninth power transistor Q5B and the eleventh power transistor Q7B to be turned on in the next stage.

According to the biphasic switched capacitor converter, by controlling the thirteenth power transistor QX1A, the fourteenth power transistor QX2A, the sixteenth power transistor QX1B and the fifteenth power transistor QX2B according to the above-mentioned control sequence, the electric charges on the first node CFLA can be transferred to the second node CFLB via the inductor L within the stage 1, and the electric charges on the second node CFLB can be transferred to the first node CFLA via the inductor L within the stage 3, so that the voltage difference of both terminal of each of the first power transistor Q1, the second power transistor Q2, the third power transistor Q3, the fourth power transistor Q4, the fifth power transistor QSA, the ninth power transistor Q5B, the sixth power transistor Q6A, the tenth power transistor Q6B, the seventh power transistor Q7A, the eleventh power transistor Q7B, the eighth power transistor Q8A and the twelfth power transistor Q8B are zero before these power transistors are turned on respectively, which greatly reduces the switching loss and improves the conversion efficiency of the switched capacitor converter.

Figure 8:
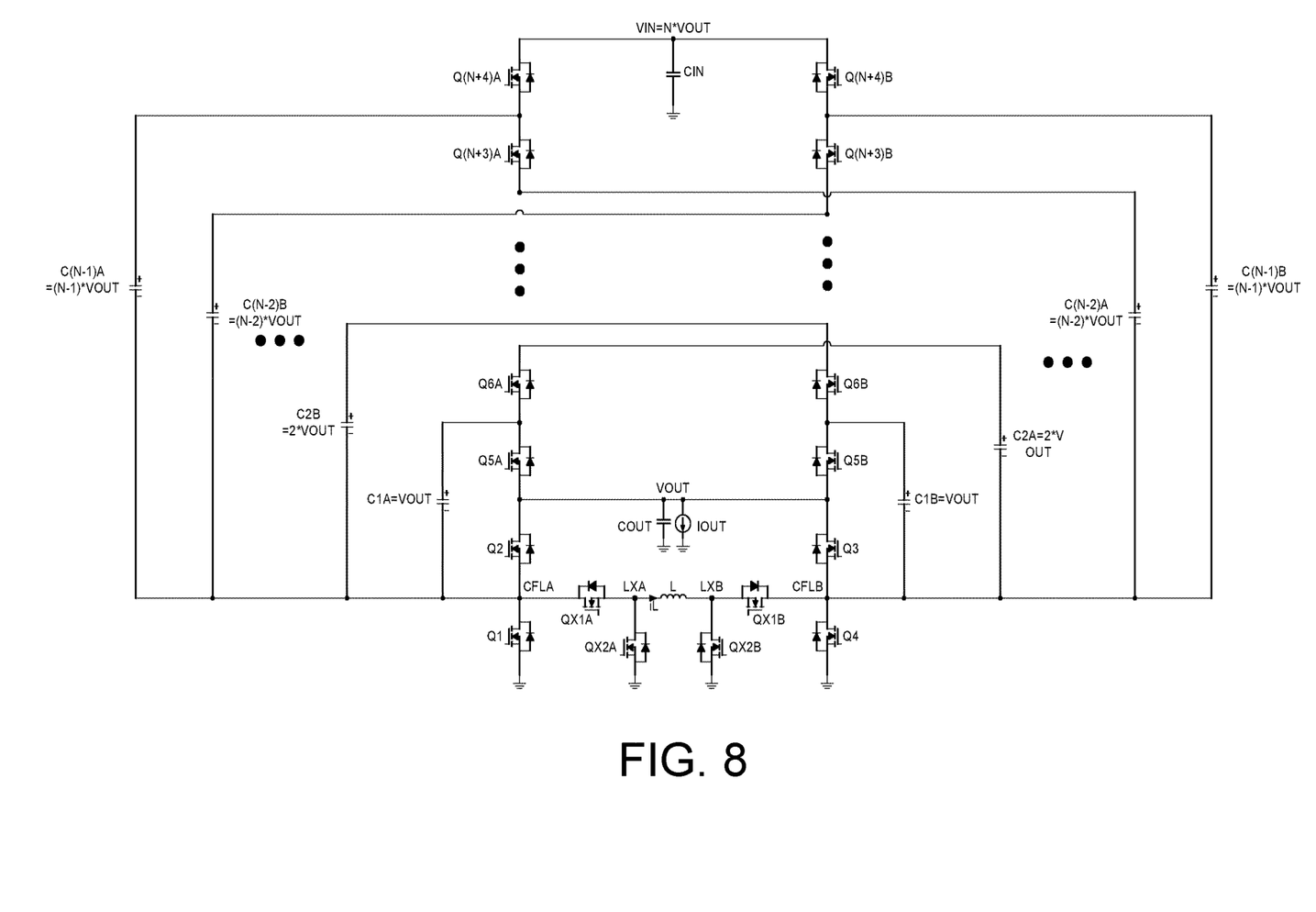
FIG. 8 is a schematic diagram of a biphasic N:1 switched capacitor converter of an embodiment according to the present application.

Based on the biphasic 4:1 switched capacitor converter shown in FIG. 2, a biphasic N:1 switched capacitor converter can be realized by adding primary power transistors and capacitors, as shown in FIG. 8. An auxiliary circuit of the biphasic N:1 switched capacitor converter of FIG. 8 is same as the auxiliary circuit as in FIG. 2, and a similar control mode can be used in the biphasic N:1 switched capacitor converter to achieve zero voltage switching of all primary power transistors. Wherein N is an integer greater than or equal to 4. When the N=4, the biphasic N:1 switched capacitor converter is the biphasic 4:1 switched capacitor converter as shown in FIG. 2.

When N is an integer greater than or equal to 5, as shown in FIG. 8, the biphasic N:1 switched capacitor converter includes an auxiliary circuit, a first branch and a second branch.

The first branch comprises a first power transistor Q1, a second power transistor Q2, N first sub power transistors and N−1 first sub capacitors, and the second branch comprises a third power transistor Q3, a fourth power transistor Q4, N second sub power transistor and N−1 second sub capacitors.

Both terminals of the auxiliary circuit are respectively connected to a first node CFLA between the first power transistor Q1 and the second power transistor Q2 which are connected with each other and a second node CFLB between the third power transistor Q3 and the fourth power transistor Q4 which are connected with each other. A circuit structure of the auxiliary circuit of the biphasic N:1 switched capacitor converter of FIG. 8 is same as that of the biphasic 4:1 switched capacitor converter as shown in FIG. 2

An input terminal of the biphasic dickson switched capacitor converter is connected to an external input voltage, the input terminal is connected to the output terminal of the biphasic dickson switched capacitor converter through the N first sub power transistors and the N−1 second sub capacitors respectively, the N first sub power transistors are connected in turn, and the N−1 second sub capacitors are connected in turn.

Any two adjacent first sub power transistors form a first sub power transistor pair, any two adjacent first sub power transistor pairs include a same first sub power transistor; and any two adjacent second sub power transistors form a second sub power transistor pair, any two adjacent second sub power transistor pairs include a same second sub power transistor.

Any two adjacent first sub power transistor pairs are configured to connect to a first terminal of a first sub capacitor of the N−1 first sub capacitors and a first terminal of a second sub capacitor of the N−1 second sub capacitors respectively, for example, any two adjacent first sub power transistor pairs include a first pair of first sub power transistor pair and a second pair of first sub power transistor pair, a first terminal of one of the N−1 first sub capacitors is connected between two first sub power transistors of the first pair of first sub power transistor pair, a first terminal of one of the N−1 second sub capacitors is connected between two first sub power transistors of the second pair of first sub power transistor pair.

Any two adjacent second sub power transistor pairs are configured to connect to a first terminal of another first sub capacitor of the N−1 first sub capacitors and a first terminal of another second sub capacitor of the N−1 second sub capacitors respectively, for example, any two adjacent second sub power transistor pairs include a first pair of second sub power transistor pair and a second pair of second sub power transistor pair, a first terminal of another of the N−1 first sub capacitors is connected between two second sub power transistors of the first pair of second sub power transistor pair, and a first terminal of another of the N−1 second sub capacitors is connected between two second sub power transistors of the second pair of second sub power transistor pair.

The output terminal is connected to a 1-th first sub power transistor pair and a 1-th second sub power transistor pair respectively, a first terminal of one of the N−1 first sub capacitors is connected between two first sub power transistors of the 1-th first sub power transistor pair, and a first terminal of one of the N−1 second sub capacitors is connected between two second sub power transistors of the 1-th second sub power transistor pair.

All second terminals of the N−1 first sub capacitors are connected to the first node CFLA, and all second terminals of the N−1 second sub capacitors are connected to the second node CFLB.

For example, as shown in FIG. 8, the N first sub power transistors include a 1-th first sub power transistor, a 2-th first sub power transistor, . . . , a (N−1)-th first sub power transistor Q(N+3)A and a N-th first sub power transistor Q(N+4)A which are connected with each other in turn, the 1-th first sub power transistor is the fifth power transistor Q5A, the 2-th first sub power transistor is the sixth power transistor Q6A, the fifth power transistor Q5A and the sixth power transistor Q6A form a 1-th first sub power transistor pair, the sixth power transistor Q6A and a first sub power transistor (no shown in FIG. 8), which is adjacent to the sixth power transistor Q6A, form a 2-th first sub power transistor pair, . . . , the (N−1)-th first sub power transistor Q(N+3)A and the N-th first sub power transistor Q(N+4)A form a (N−1)-th first sub power transistor pair. The N−1 first sub capacitors include a 1-th first sub capacitor, a 2-th first sub capacitor, . . . , a (N−2)-th first sub capacitor and a (N−1)-th first sub capacitor, the 1-th first sub capacitor is the first capacitor OA, the 2-th first sub capacitor is the second capacitor C2B, when N is an even number, the (N−2)-th first sub capacitor is a first sub capacitor C(N−2)B, and the (N−1) first sub capacitor is a first sub capacitor C(N−1)A, and when N is an odd number, the (N−2)-th first sub capacitor is a first sub capacitor C(N−2)A, and the (N−1) first sub capacitor is a first sub capacitor C(N−1)B.

The input terminal of the biphasic dickson switched capacitor converter is connected to the output terminal of the biphasic dickson switched capacitor converter through the N-th first sub power transistor Q(N+4)A, the (N−1)-th first sub power transistor Q(N+3)A, . . . , the 2-th first sub power transistor and the 1-th first sub power transistor respectively.

The N second sub power transistors include a 1-th second sub power transistor, a 2-th second sub power transistor, . . . , a (N−1)-th second sub power transistor Q(N+3)B and a N-th second sub power transistor Q(N+4)B which are connected with each other in turn, the 1-th second sub power transistor is the ninth power transistor QSB, the 2-th second sub power transistor is the tenth power transistor Q6B, the ninth power transistor Q5B and the tenth power transistor Q6B form a 1-th second sub power transistor pair, the sixth power transistor Q6B and a second sub power transistor (no shown in FIG. 8), which is adjacent to the sixth power transistor Q6B, form a 2-th second sub power transistor pair, . . . , the (N−1)-th second sub power transistor Q(N+3)B and the N-th second sub power transistor Q(N+4)B form a (N−1)-th second sub power transistor pair. The N-1 second sub capacitors include a 1-th second sub capacitor, a 2-th second sub capacitor, . . . , a (N-2)-th second sub capacitor and a (N-1)-th second sub capacitor, the 1-th second sub capacitor is the fourth capacitor C1B, the 2-th second sub capacitor is the fifth capacitor C2B, when N is an even number, the (N-2)-th second sub capacitor is a second sub capacitor C(N-2)A, and the (N-1) second sub capacitor is a second sub capacitor C(N-1)B, and when N is an odd number, the (N-2)-th second sub capacitor is a second sub capacitor C(N-2)B, and the (N-1) second sub capacitor is a second sub capacitor C(N-1)A.

The input terminal of the biphasic dickson switched capacitor converter is connected to the output terminal of the biphasic dickson switched capacitor converter through the N-th second sub power transistor Q(N+4)B, the (N-1)-th second sub power transistor Q(N+3)B, . . . , the 2-th second sub power transistor and the 1-th second sub power transistor respectively.

The second terminal of the second power transistor Q2, second terminals of all the first sub capacitors and the first terminal of the first power transistor Q1 are connected as a first node CFLA, and the second terminal of the third power transistor Q3, second terminals of all the second sub capacitors and the first terminal of the fourth power transistor Q4 are connected as a second node CFLB.

The first terminal of the first capacitor OA is connected between the fifth power transistor Q5A and the sixth power transistor Q6A of the 1-th first sub power transistor pair, and the first terminal of the second capacitor C2B is connected to between the tenth power transistor Q6B and the second sub power transistor, which is adjacent to the tenth power transistor Q6B, of the 2-th second sub power transistor pair. When the N is an even number, a first terminal of the (N-1)-th first sub capacitor is connected between the (N-1) th first sub power transistor Q(N+3)A and the N-th first sub power transistor Q(N+4)A of the (N-1)-th first sub power transistor pair, and when the N is an odd number, the first terminal of the (N-1)-th first sub capacitor is connected between the (N-1)th second sub power transistor Q(N+3)B and the N-th second sub power transistor Q(N+4)B of the (N-1)-th second sub power transistor pair.

The first terminal of the fourth capacitor C1B is connected between the ninth power transistor Q5B and the tenth power transistor Q6B of the 1-th second sub power transistor pair, and the first terminal of the fifth capacitor C2A is connected to between the sixth power transistor Q6A and the first sub power transistor, which is adjacent to the sixth power transistor Q6A, of the 2-th first sub power transistor pair. When the N is an even number, a first terminal of the (N-1)-th second sub capacitor is connected between the (N-1)th second sub power transistor Q(N+3)B and the N-th second sub power transistor Q(N+4)B of the (N-1)-th second sub power transistor pair, and when the N is an odd number, the first terminal of the (N-1)-th second sub capacitor is connected between the (N-1)th first sub power transistor Q(N+3)A and the N-th first sub power transistor Q(N+4)A of the (N-1)-th first sub power transistor pair.

In all embodiments of the present application, all the power transistors and all the sub power transistors are switch transistors, for example, P-type transistors or N-type transistors. All the power transistors and all the sub power transistors of the first branch and the second branch are primary power transistors, and each primary power transistor has a parasitic capacitor.

The auxiliary circuit shown in FIG. 2 includes four NMOS and an inductor, and it can be realized that the electric charges at one branch can be transferred to another branch by controlling the auxiliary circuit during the dead time when all the primary power transistors are turned off, so as to realize zero voltage switching of all the primary power transistors and reducing switching loss. Besides the auxiliary circuit of FIG. 2, various other types of circuits can also perform the function of the ZVS of all the primary power transistors. For example, a variety of different auxiliary circuits are shown in FIG. 9.

Figure 9:
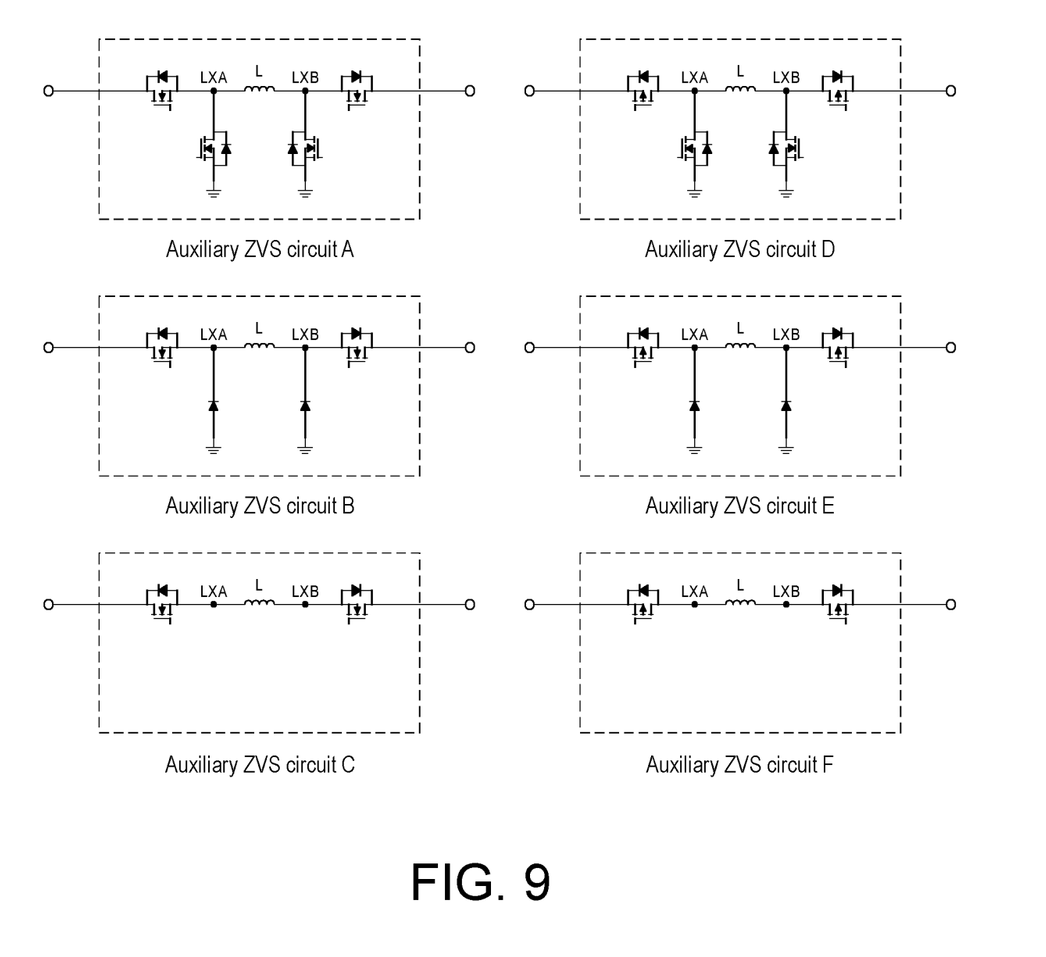
FIG. 9 is a schematic diagram showing circuit structures of various auxiliary circuits of an embodiment according to the present application.

As shown in FIG. 9, the auxiliary circuit includes a thirteenth power transistor, a fourteenth power transistor, an fifteenth power transistor, a sixteenth power transistor and an inductor; a first terminal of the thirteenth power transistor is connected to the first node CFLA of the first branch, a second terminal of the thirteenth power transistor is connected to a first terminal of the fourteenth power transistor and a first terminal of the inductor, and a second terminal of the fourteenth power transistor is grounded; a second terminal of the inductor is connected to a first terminal of the fifteenth power transistor and a first terminal of the sixteenth power transistor, a second terminal of the fifteenth power transistor is grounded, and a second terminal of the sixteenth power transistor is connected to the second node CFLB of the second branch. When the thirteenth power transistor, the fourteenth power transistor, the fifteenth power transistor and the sixteenth power transistor are N-type power transistors, the auxiliary circuit is shown by an auxiliary ZVS circuit A of FIG. 9, when the thirteenth power transistor and the sixteenth power transistor are P-type power transistors, and the fourteenth power transistor and the fifteenth power transistor are N-type power transistors, the auxiliary circuit is shown by an auxiliary ZVS circuit D of FIG. 9

According to another embodiment of the present application, as shown in FIG. 9, the auxiliary circuit includes a thirteenth power transistor, a sixteenth power transistor, a first diode, a second diode and an inductor; a first terminal of the thirteenth power transistor is connected to the first node CFLA of the first branch, a second terminal of the thirteenth power transistor is connected to a first terminal of the first diode and a first terminal of the inductor, a second terminal of the first diode is grounded, the first terminal of the first diode is a cathode, and the second terminal of the first diode is an anode; a second terminal of the inductor is connected to a first terminal of the second diode and a first terminal of the sixteenth power transistor, a second terminal of the second diode is grounded, the first terminal of the second diode is a cathode, the second terminal of the second diode is an anode, and a second terminal of the sixteenth power transistor is connected to the second node CFLB of the second branch. When the thirteenth power transistor and the sixteenth power transistor are N-type power transistors, the auxiliary circuit is shown by an auxiliary ZVS circuit B of FIG. 9, when the thirteenth power transistor and the sixteenth power transistor are P-type power transistors, the auxiliary circuit is shown by an auxiliary ZVS circuit E of FIG. 9.

According to another embodiment of the present application, as shown in FIG. 9, the auxiliary ZVS circuit includes a thirteenth power transistor, a sixteenth power transistor and inductor, a first terminal of the thirteenth power transistor is connected to the first node CFLA of the first branch, a second terminal of the thirteenth power transistor is connected to a first terminal of the inductor, a second terminal of the inductor is connected to a first terminal of the sixteenth power transistor, and a second terminal of the sixteenth power transistor is connected to the second node CFLB of the second branch. When the thirteenth power transistor and the sixteenth power transistor are N-type power transistors, the auxiliary circuit is shown by an auxiliary ZVS circuit C of FIG. 9, when the thirteenth power transistor and the sixteenth power transistor are P-type power transistors, the auxiliary circuit is shown by an auxiliary ZVS circuit F of FIG. 9.

Since the specific implementation modes of the circuit structure are various, and the corresponding control methods are also various, they cannot be exemplified one by one in the present application, after those skilled in the art understand the contents of the present application, various modifications, variations or equivalents of the above described examples may be readily conceived, but still be controlled by the limitations set forth in the claims and any equivalents thereof

What is claimed is:

1. A biphasic dickson switched capacitor converter, comprising a first branch, a second branch and an auxiliary circuit, wherein the auxiliary circuit is connected between the first branch and the second branch, the first branch and the second branch are connected in parallel to an output terminal of the biphasic dickson switched capacitor converter, and power transistors of the first branch and the second branch are primary power transistors;

wherein the auxiliary circuit is configured to transfer an electric charge or electric charges on one of the first branch and the second branch to another of the first branch and the second branch during a dead time when the primary power transistors are turned off, so that voltage difference between both terminals of each of the primary power transistors become zero to, then the primary power transistors are turned on under a zero voltage respectively;

wherein the auxiliary circuit comprises a thirteenth power transistor, a fourteenth power transistor, a fifteenth power transistor, a sixteenth power transistor and an inductor;

a first terminal of the thirteenth power transistor is connected to a first node of the first branch, a second terminal of the thirteenth power transistor is connected to a first terminal of the inductor and a first terminal of the fourteenth power transistor respectively, and a second terminal of the fourteenth power transistor is grounded; and a second terminal of the inductor is connected to a first terminal of the fifteenth power transistor and a first terminal of the sixteenth power transistor respectively, a second terminal of the fifteenth power transistor is grounded, and a second terminal of the sixteenth power transistor is connected to a second node of the second branch;

or, wherein the auxiliary circuit comprises a thirteenth power transistor, a sixteenth power transistor, a first diode, a second diode and an inductor;

a first terminal of the thirteenth power transistor is connected to the first branch, a second terminal of the thirteenth power transistor is connected to a first terminal of the first diode and a first terminal of the inductor, a second terminal of the first diode is grounded; and a second terminal of the inductor is connected to a first terminal of the second diode and a first terminal of the sixteenth power transistor, a second terminal of the second diode is grounded, and a second terminal of the sixteenth power transistor is connected to the second branch;

or, wherein the auxiliary circuit includes a thirteenth power transistor, a sixteenth power transistor and inductor, a first terminal of the thirteenth power transistor is connected to the first branch, a second terminal of the thirteenth power transistor is connected to a first terminal of the inductor, a second terminal of the inductor is connected to a first terminal of the sixteenth power transistor, and a second terminal of the sixteenth power transistor is connected to the second branch.

2. The biphasic dickson switched capacitor converter according to claim 1, wherein the biphasic dickson switched capacitor converter is a biphasic dickson 4:1 switched capacitor converter, the first branch comprises a first power transistor, a second power transistor, a fifth power transistor, a sixth power transistor, a seventh power transistor, an eighth power transistor, a first capacitor, a second capacitor and a third capacitor, and the second branch comprises a third power transistor, a fourth power transistor, a ninth power transistor, a tenth power transistor, an eleventh power transistor, a twelfth power transistor, a fourth capacitor, a fifth capacitor and a sixth capacitor;

a first terminal of the eighth power transistor and a first terminal of the twelfth power transistor are connected as an input terminal of the biphasic dickson switched capacitor converter, the input terminal of the biphasic dickson switched capacitor converter is connected to an external input voltage, a second terminal of the eighth power transistor is connected to a first terminal of the seventh power transistor and a first terminal of the third capacitor respectively, and a second terminal of the twelfth power transistor is connected to a first terminal of the eleventh power transistor and a first terminal of the sixth capacitor respectively;

a second terminal of the seventh power transistor is connected to a first terminal of the sixth power transistor and a first terminal of the fifth capacitor respectively, and a second terminal of the eleventh power transistor is connected to a first terminal of the tenth power transistor and a first terminal of the second capacitor respectively;

a second terminal of the sixth power transistor is connected to a first terminal of the fifth power transistor and a first terminal of the first capacitor, and a second terminal of the tenth power transistor is connected to a first terminal of the ninth power transistor and a first terminal of the fourth capacitor respectively;

a second terminal of the fifth power transistor is connected to a first terminal of the second power transistor, and a second terminal of the ninth power transistor is connected to a first terminal of the third power transistor;

a second terminal of the second power transistor is connected to a first terminal of the first power transistor, a second terminal of the first capacitor, a second terminal of the second capacitor and a second terminal of the third capacitor respectively; a second terminal of the third power transistor is connected to a first terminal of the fourth power transistor, a second terminal of the fourth capacitor, a second terminal of the fifth capacitor and a second terminal of the sixth capacitor respectively; and a second terminal of the first power transistor and a second terminal of the fourth power transistor are grounded;

the second terminal of the fifth power transistor, the first terminal of the second power transistor, the first terminal of the third power transistor and the second terminal of the ninth power transistor are connected as the output terminal; and the first terminal of the first power transistor, the second terminal of the second power transistor, the second terminal of the first capacitor, the second terminal of the second capacitor and the second terminal of the third capacitor are connected as the first node of the first branch, and the second terminal of the third power transistor, the first terminal of the fourth power transistor, the second terminal of the fourth capacitor, the second terminal of the fifth capacitor and the second terminal of the sixth capacitor are connected as the second node of the second branch.

3. The biphasic dickson switched capacitor converter according to claim 1, wherein a working sequence of the biphasic dickson switched capacitor converter comprises four stages as follows:

a first stage: the second power transistor, the fourth power transistor, the sixth power transistor, the eighth power transistor, the ninth power transistor, the eleventh power transistor, the fourteenth power transistor and the sixteenth power transistor are turned on, and remaining power transistors are turned off; the first capacitor, the second capacitor and the third capacitor are in a charging state, the fourth capacitor, the fifth capacitor and the sixth capacitor are in a discharging state, and a current on the inductor is zero;

a second stage: the thirteenth power transistor and the sixteenth power transistor are turned on, and remaining power transistors are turned off, the current on the inductor increases and then decreases, and the second stage ends when the current on the inductor decreases to zero;

a third stage: the first power transistor, the third power transistor, the fifth power transistor, the seventh power transistor, the tenth power transistor, the twelfth power transistor, the thirteenth power transistor and the fifteenth power transistor are turned on, and remaining power transistors are turned off; the first capacitor, the second capacitor and the third capacitor are in the discharging state, the fourth capacitor, the fifth capacitor and the sixth capacitor are in the charging state, and the current on the inductor is zero; and a fourth stage: the thirteenth power transistor and the sixteenth power transistor are turned on, and remaining power transistors are turned off, the current on the inductor increases and then decreases, and the fourth stage ends when the current on the inductor decreases to zero, and returning to the first stage.

4. The biphasic dickson switched capacitor converter according to claim 1, wherein the thirteenth power transistor, the fourteenth power transistor, the fifteenth power transistor and the sixteenth power transistor are N-type power transistors; or the thirteenth power transistor and the sixteenth power transistor are P-type power transistors, and the fourteenth power transistor and the fifteenth power transistor are N-type power transistors.

5. The biphasic dickson switched capacitor converter according to claim 1, wherein the biphasic dickson switched capacitor converter is biphasic Dickson N:1 switched capacitor converter, and N is an integer greater than or equal to 5;

the first branch comprises a first power transistor, a second power transistor, N first sub power transistors and N-1 first sub capacitors, and the second branch comprises a third power transistor, a fourth power transistor, N second sub power transistor and N-1 second sub capacitors;

both terminals of the auxiliary circuit are connected to the first node between the first power transistor and the second power transistor and the second node between the third power transistor and the fourth power transistor respectively;

an input terminal of the biphasic dickson switched capacitor converter is connected to the output terminal through the N first sub power transistors and the N-1 second sub capacitors respectively, wherein the N first sub power transistors are connected in turn, and the N-1 second sub capacitors are connected in turn;

two adjacent first sub power transistors form a first sub power transistor pair, two adjacent first sub power transistor pairs comprise a same first sub power transistor; and two adjacent second sub power transistors form a second sub power transistor pair, two adjacent second sub power transistor pairs comprise a same second sub power transistor;

any two adjacent first sub power transistor pairs comprise a first pair of first sub power transistor pair and a second pair of first sub power transistor pair, one of the N-1 first sub capacitors is connected between two first sub power transistors of the first pair of first sub power transistor pair, one of the N-1 second sub capacitors is connected between two first sub power transistors of the second pair of first sub power transistor pair;

any two adjacent second sub power transistor pairs comprise a first pair of second sub power transistor pair and a second pair of second sub power transistor pair, another of the N-1 first sub capacitors is connected between two second sub power transistors of the first pair of second sub power transistor pair, and another of the N-1 second sub capacitors is connected between two second sub power transistors of the second pair of second sub power transistor pair;

one of the N-1 first sub capacitors is connected between two first sub power transistors of a 1-th first sub power transistor pair which is connected the output terminal, and one of the N-1 second sub capacitors is connected between two second sub power transistors of a 1-th second sub power transistor pair which is connected the output terminal; and all second terminals of the N-1 first sub capacitors are connected to the first node, and all second terminals of the N-1 second sub capacitors are connected to the second node.

6. The biphasic dickson switched capacitor converter according to claim 1, wherein the thirteenth power transistor, the fourteenth power transistor, the fifteenth power transistor and the sixteenth power transistor are N-type power transistors; or the thirteenth power transistor and the sixteenth power transistor are P-type power transistors, and the fourteenth power transistor and the fifteenth power transistor are N-type power transistors.

7. The biphasic dickson switched capacitor converter according to claim 1, wherein the thirteenth power transistor and the sixteenth power transistor are N-type power transistors or P-type power transistors.

8. The biphasic dickson switched capacitor converter according to claim 1, wherein the thirteenth power transistor and the sixteenth power transistor are N-type power transistors or P-type power transistors.

* * * * *